US010259010B2

(12) United States Patent
Seyler

(10) Patent No.: US 10,259,010 B2
(45) Date of Patent: Apr. 16, 2019

(54) DEVICES, SYSTEMS, AND METHODS FOR CURING A COATING

(71) Applicant: CarMax Business Services, LLC, Manakin-Sabot, VA (US)

(72) Inventor: Andrew Seyler, Henrico, VA (US)

(73) Assignee: CarMax Business Services, LLC, Manakin-Sabot, VA (US)

( * ) Notice: Subject to any disclaimer, the term of this patent is extended or adjusted under 35 U.S.C. 154(b) by 695 days.

(21) Appl. No.: 14/473,788

(22) Filed: Aug. 29, 2014

(65) Prior Publication Data

US 2016/0059262 A1 Mar. 3, 2016

(51) Int. Cl.

*B05D 3/00* (2006.01)
*C08J 7/18* (2006.01)
*G21H 5/00* (2006.01)
*B05D 3/06* (2006.01)

(52) U.S. Cl.

CPC .................................... *B05D 3/067* (2013.01)

(58) Field of Classification Search

CPC ........ B05D 3/061; B05D 3/065; B05D 3/067; G21K 5/00
USPC .................................................. 427/553, 558
See application file for complete search history.

(56) References Cited

U.S. PATENT DOCUMENTS 4,504,374 A 3/1985 Lewarchik et al.
4,621,187 A * 11/1986 Petro, Jr. ................. B05B 15/12 118/326
5,684,083 A 11/1997 Temple et al.
6,232,364 B1 5/2001 Fukuda et al.
6,312,765 B1 11/2001 Ueno
6,573,665 B2 6/2003 Cooper et al.
6,617,589 B2 9/2003 Ueno
6,838,177 B2 1/2005 Fenn et al.
6,949,591 B1 9/2005 Allard et al.
7,491,419 B2 2/2009 Stropp et al.
7,553,879 B2 6/2009 Laginess et al.
7,704,564 B2 * 4/2010 DeRegge .................. F26B 3/28 427/487
8,227,050 B1 7/2012 O'Neil
(Continued)

FOREIGN PATENT DOCUMENTS

EP 0 487 323 A1 5/1992
JP H 4-22474 A 1/1992

OTHER PUBLICATIONS

LM-9000 UV Lamp Monitor; UVPS, www.uvprocess.com; 2005.*
(Continued)

*Primary Examiner* — Michael P Wieczorek
(74) *Attorney, Agent, or Firm* — Finnegan, Henderson, Farabow, Garrett & Dunner, LLP

(57) ABSTRACT

A method for curing an automotive coating is disclosed. The method includes applying a first automotive coating to at least one surface; moving a hand-held ultraviolet light source into a booth that has the at least one coated surface; curing the first automotive coating with the ultraviolet light source; moving the ultraviolet light source out of the booth that has the at least one coated surface; applying a second automotive coating to the at least one surface; moving the ultraviolet light source into a booth that has the at least one coated surface; curing the second automotive coating with the ultraviolet light source; and moving the ultraviolet light source out of the booth that has the at least one coated surface.

20 Claims, 9 Drawing Sheets

(56) References Cited

U.S. PATENT DOCUMENTS

| | | | | |
|---|---|---|---|---|
| 8,362,451 | B2 | 1/2013 | Yoon et al. | |
| 8,459,839 | B2 * | 6/2013 | Wakalopulos | B05D 3/067 315/76 |
| 8,633,453 | B2 | 1/2014 | Karunaratne et al. | |
| 9,099,213 | B2 * | 8/2015 | Wilson | G21K 5/00 |
| 2002/0119259 | A1 * | 8/2002 | Kamei | B05D 5/068 427/558 |
| 2007/0116866 | A1 | 5/2007 | Mich | |
| 2007/0271812 | A1 * | 11/2007 | Swoboda | F26B 3/283 34/266 |
| 2010/0010162 | A1 | 1/2010 | Itou et al. | |
| 2010/0196622 | A1 | 8/2010 | Van Pul et al. | |
| 2012/0183784 | A1 | 7/2012 | Russell | |
| 2013/0164542 | A1 | 6/2013 | Geels et al. | |
| 2013/0289129 | A1 | 10/2013 | Yokoyama et al. | |

OTHER PUBLICATIONS

New Lamp Monitor for UV Curing; PCI Magazine; pp. 70-72; Nov. 2001.*

K. Maag et al., New UV curing systems for automotive applications, Progress in Organic Coatings, 2000, vol. 40, pp. 93-97.

P. Mills, Robotic UV Curing for Automotive Exterior Applications: A cost-effective and technically viable alternative for UV curing, North American Automotive UV Consortium, Strongsville, OH, 2005.

J. Stropp et al., UV curing systems for automotive refinish applications, Progress in Organic Coatings, 2006, vol. 55, pp. 201-205.

* cited by examiner

DEVICES, SYSTEMS, AND METHODS FOR CURING A COATING

Embodiments of the present disclosure relate to an ultraviolet (UV) lamp, and more particularly, to methods of utilizing a UV lamp for curing a coating.

Automobile substrates typically include multiple layers of coatings. For example, these coating layers may include primers, primers/sealers, sealers, color coats, and clear coats. These coatings are applied to an automobile substrate during the manufacture of the automobile, and some or all of the coatings may be applied during a repair of an automobile. During an automotive repair, multiple panels may be repaired, or a portion of a single panel may be repaired. Whether a substrate is to be coated during a manufacturing process or during a repairing process, the surface of the substrate is first prepared by various processes, which may include general repairing, smoothing, and cleaning.

One or more primer layers are applied to the prepared substrate to smooth, provide adhesion to, and protect the substrate. After a primer has been applied to the substrate, it is desirable to dry or cure the primer before applying a subsequent coating layer. After the primer has been cured, color coats are applied to give the substrate a desired color. Following the color coat, a protective clear coat is typically applied on top of the color coat.

A current challenge in the automotive manufacturing and repair arts is to minimize the time taken to apply automotive coatings. In particular, it is desirable to reduce the time it takes to cure a primer. It is also desirable to reduce disruptions during curing, such as, for example, having to replace a curing lamp once a curing process has commenced. Further, it is desirable to maintain the quality of the repairs and eliminate process failures due to a degrading lamp.

Embodiments of the present disclosure may set out to solve one or more of the above problems.

In accordance with one embodiment, a device for curing a coating is disclosed. The device may include a housing having an ultraviolet light source and a handle configured for moving the ultraviolet light source while the ultraviolet light source is emitting ultraviolet light; a circuit configured to measure a usage parameter, which includes one of an amount of time that the ultraviolet light source has emitted light and an amount of energy that the ultraviolet light source has consumed while emitting light; and an interface for receiving AC power.

Various embodiments of the disclosure may include one or more of the following aspects: a base unit including the interface for receiving power and a cradle for docking the housing, wherein the housing is connected to base unit by at least one cable; an indicator for indicating at least one of a value representing the usage parameter and an indication that the usage parameter has exceeded a predetermined value; at least two wheels connected to the base unit; and a transformer for receiving the AC power and outputting the AC power to the light source at a reduced voltage from which it was received.

In another embodiment of the disclosure, a method for curing an automotive coating is disclosed. The method includes applying a first automotive coating to at least one surface; moving a hand-held ultraviolet source into a booth that has the at least one surface coated with the first automotive coating; curing the first automotive coating with the ultraviolet light source; moving the ultraviolet light source out of the booth that has the at least one surface coated with the first automotive coating; applying a second automotive coating to at least one surface; moving the ultraviolet light source into a booth that has the at least one surface coated with the second automotive coating; curing the second automotive coating with the ultraviolet light source; and moving the ultraviolet light source out of the booth that has the at least one surface coated with the second automotive coating. In one embodiment, the first and second automotive coating may be the same. In another embodiment, the first and second automotive coating may be different. In one embodiment, the at least one surface coated with the first automotive coating is the same as the at least one surface coated with the second automotive coating. In another embodiment, the at least one surface coated with the first automotive coating is different than the at least one surface coated with the second automotive coating.

In another embodiment of the disclosure, a method for curing an automotive coating is disclosed. The method includes applying an automotive coating to at least one surface; moving a hand-held ultraviolet light source into a booth that has the at least one coated surface; curing the automotive coating with the ultraviolet light source; moving the ultraviolet light source out of the booth that has the at least one coated surface; applying a different automotive coating to at least one different surface; moving the ultraviolet light source into a booth that has the at least one coated different surface; curing the different automotive coating with the ultraviolet light source; and moving the ultraviolet light source out of the booth that has the at least one coated different surface.

In another embodiment, a method for curing an automotive coating is disclosed. The method includes applying an automotive coating to at least one surface; moving a hand-held ultraviolet light source into a booth that has the at least one coated surface; curing the automotive coating with the ultraviolet light source; moving the ultraviolet light source out of the booth that has the at least one coated surface; applying a different automotive coating to at least one different surface; moving the ultraviolet light source into a booth that has the at least one coated different surface; curing the different automotive coating with the ultraviolet light source; and moving the ultraviolet light source out of the booth that has the at least one coated different surface.

Various embodiments of the disclosure may include one or more of the following aspects: wherein the booth that has the at least one coated surface is the same booth as the booth that has the at least one coated different surface; wherein the booth that has the at least one coated surface is a different booth than the booth that has the at least one coated different surface; wherein the automotive coating and the different automotive coatings are applied in the same booth that they are cured with the ultraviolet light source; wherein the ultraviolet light source is attached to a base unit having a transformer for receiving AC power, and wherein moving an ultraviolet light source into a booth includes leaving the base unit outside of the booth; wherein the ultraviolet light source is attached to a base unit having a transformer for receiving AC power, and wherein moving an ultraviolet light source into a booth includes moving the base unit into the booth; wherein curing the automotive coating with the ultraviolet light source includes holding the ultraviolet light source within 12 inches of the surface; wherein curing the automotive coating with the ultraviolet light source includes holding the ultraviolet light source as close as possible to the surface without bringing the ultraviolet light source into contact with the surface; wherein curing the automotive coating with the ultraviolet light source includes holding the ultraviolet light source as close as possible to the surface without damaging the automotive coating on the surface; before curing the automotive coating with the ultraviolet light source, verifying that the ultraviolet light source will not expire while curing the automotive coating; replacing the ultraviolet light source before the ultraviolet light source expires; wherein the ultraviolet light source is attached to a base unit having a transformer for receiving AC power, and wherein curing the automotive coating with the ultraviolet light source includes supplying electrical power to the ultraviolet light source at voltage less than the voltage that the transformer receives AC power; and wherein a boundary of at least one of the booths includes a curtain configured to block ultraviolet light.

In another embodiment, a method for curing an automotive coating is disclosed. The method includes providing a non-expired hand-held ultraviolet light source; determining if the ultraviolet light source will expire during curing of an automotive coating; applying an automotive coating to at least one surface; curing the automotive coating with the ultraviolet light source; and replacing the ultraviolet light source.

Various embodiments of the disclosure may include, wherein the ultraviolet light source is replaced before the ultraviolet light source expires.

Additional objects and advantages of the embodiments will be set forth in part in the description that follows, and in part will be obvious from the description, or may be learned by practice of the embodiments. The objects and advantages of the embodiments will be realized and attained by means of the elements and combinations particularly pointed out in the appended claims.

It is to be understood that both the foregoing general description and the following detailed description are exemplary and explanatory only and are not restrictive of the invention, as claimed.

The accompanying drawings, which are incorporated in and constitute a part of this specification, illustrate embodiments of the disclosure, and together with the description, serve to explain the principles of the disclosure.

Reference will now be made in detail to the exemplary embodiments of the present disclosure described below and illustrated in the accompanying drawings. Wherever possible, the same reference numbers will be used throughout the drawings to refer to same or like parts.

Figure 1:
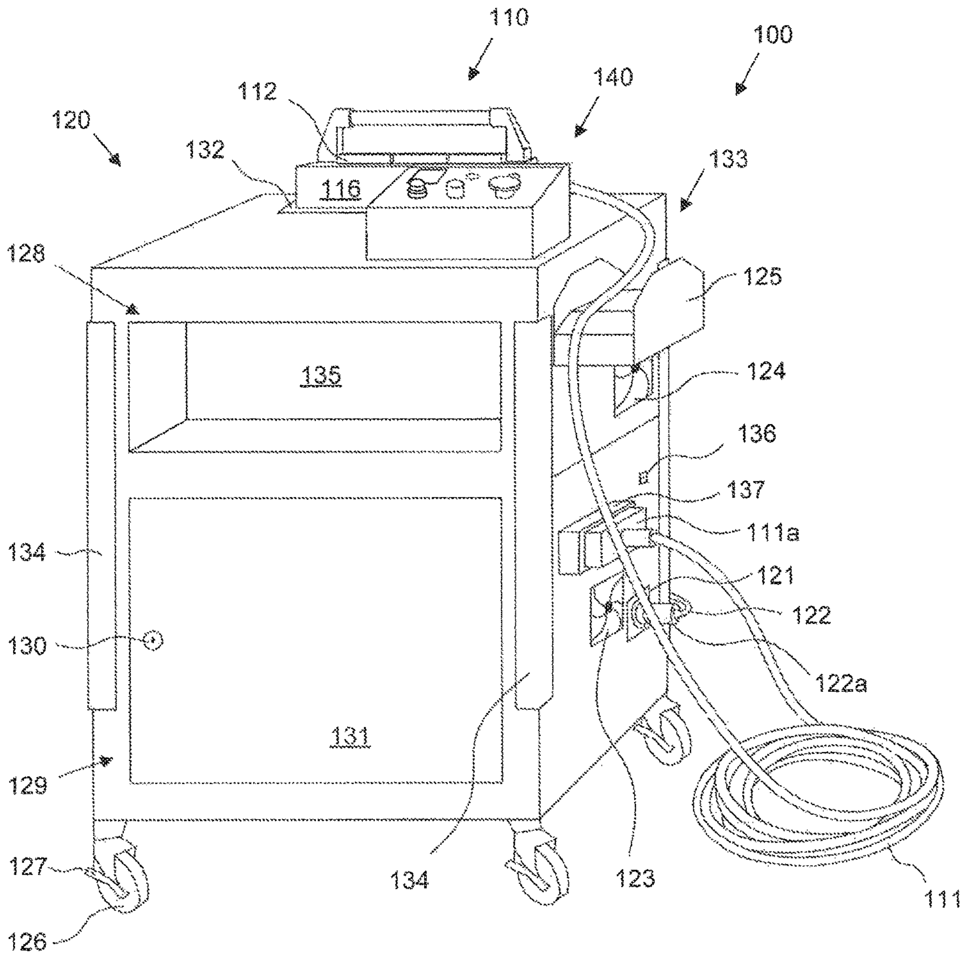
FIG. 1 illustrates an exemplary curing device, according to an embodiment of the present disclosure.

While the present disclosure is described herein with reference to illustrative embodiments of a curing device, it is understood that the devices and methods of the present disclosure may be employed with various types of curing devices. Those having ordinary skill in the art and access to the teachings provided herein will recognize additional modifications, applications, embodiments, and substitutions of equivalents that all fall within the scope of the disclosure. Accordingly, the disclosure is not to be considered as limited by the foregoing or following descriptions.

Other features and advantages and potential uses of the present disclosure will become apparent to someone skilled in the art from the following description of the disclosure, which refers to the accompanying drawings.

FIGS. 1-5 depict a curing device 100, according to an exemplary embodiment of the present disclosure. The curing device 100 may include a mobile base unit 120 having a substantially rectangular cross section. The base unit 120 may be comprised of metal or plastic. Four wheels 126 may be provided at the base of the base unit 120. The wheels 126 may include casters or rollers, or a combination thereof, and may be positioned at respective corners of the base unit 120. One or more of the wheels 126 may be configured to lock into place. For example, the wheels 126 may include a lever-brake assembly, wherein actuation of a lever 127 prevents free rotation of the wheel 126. In other embodiments, the base unit 120 may include two or three wheels 126.

Each vertical edge at the corners of the base unit 120 may include a bumper assembly 134. The bumper assemblies 134 may be comprised of a polymer, such as plastic or rubber, and may have a colored pattern, such as alternating yellow and black stripes. A front side of the base unit 120 may define an opening that provides access to a storage compartment 128. An electrical compartment 129 may be located beneath the storage compartment 128. The sides of the base unit 120 form the sides of the electrical compartment 129 and the storage compartment 128. The electrical compartment 129 may have a hinged door 131 that is configured to pivot and provide access to the electrical compartment 129 at the front side of the base unit 120. The door 131 may include a lock 130 that is configured to lock the door 131 in the closed position, and thus, prevent access to the inside of the electrical compartment 129. The electrical compartment 129 may extend to the back of the base unit 120, whereas, the storage compartment 128 may extend approximately half-way towards the back of the base unit 120. A partition 135 may form the back side of the storage compartment 128.

The top surface of the base unit 120 may include a control panel 140 and a cradle 132 for a lamp assembly 110. The cradle 132 may define an opening providing access to a lamp compartment 133. The sides of the base unit 120 may also form the sides of the lamp compartment 133, and the back of the base unit 120 may form the back of the lamp compartment 133 and the electrical compartment 129. The partition 135 may form the front side of the lamp compartment 133. The lamp compartment 133 may include a fan 124 for forcing air into the lamp compartment 133. The fan 124 may include a dust cover or filter for removing particles in the air before the air is forced into the lamp compartment 133. The lamp compartment 133 may include at least one vent (not shown) for allowing the forced air to exit the lamp compartment 133. The at least one vent may also include a dust cover or filter. In some embodiments, the at least one vent may also include a fan to assist in removing air from inside the lamp compartment 133. The fan 124 may be positioned to force air along a path inside the lamp compartment 133, such that the forced air is able to transfer heat away from the lamp assembly 110. The fan 124 may also be configured to exhaust air from the lamp compartment 133. In this case a vent fan or lamp fans 112 may be configured to force air into the lamp compartment 133.

One of the sides of the base unit 120 may include a cable reel 125 for wrapping a lamp cable 111. The lamp cable 111 may be coiled around the cable reel 125 during storage or while the base unit 120 is being moved. The lamp cable 111 may terminate at a plug 111*a* that may be configured to interface with a lamp socket 137. The lamp socket 137 may be located on a side of the base unit 120 and may be in electrical communication with components within the electrical compartment 129. Components within the electrical compartment 129 may also be in electrical communication with a power interface socket 121. The power interface socket 121 may be positioned on a side of the base unit 120 and be configured to accept a plug 122*a* from a power cable 122. In some embodiments the base unit 120 may include an additional reel for wrapping a power cable, and in some embodiments the power cable may be wrapped around the cable reel. The electrical compartment 129 may also include a fan 123 for forcing air inside the electrical compartment 129. Similar to fan 124, the fan 123 may include a dust cover or filter for removing particles in the air before the air is forced into the electrical compartment 129. The electrical compartment 129 may include at least one vent (not shown) for allowing the forced air to exit the electrical compartment 129. The at least one vent may also include a dust cover or filter. In some embodiments, the at least one vent may also include a fan to assist in removing air from inside the electrical compartment 129. In some embodiments, the electrical compartment may be in fluid communication with the lamp compartment 133, such that air may be exhausted out of either compartment. The fan 123 may be positioned to force air along a path inside the electrical compartment 129, such that the forced air is able to transfer heat away from the components within the electrical compartment 129. The fan 123 may also be configured to exhaust air from the electrical compartment 129. In this case a vent fan or lamp fans 112 may be configured to force air into the electrical compartment 129 in addition to the lamp compartment 133. A side of the base unit 120 may also include a main power switch 136 for turning on the electrical components within the electrical compartment 129. In other embodiments, the main power switch 136 may be located on other surfaces of the base unit 120 including the control panel 140. A side of the base unit 120 may also include shelves (not shown) configured to temporarily store and provide access to aerosol canisters for primers, coatings, and paint, for example.

Figure 2A:
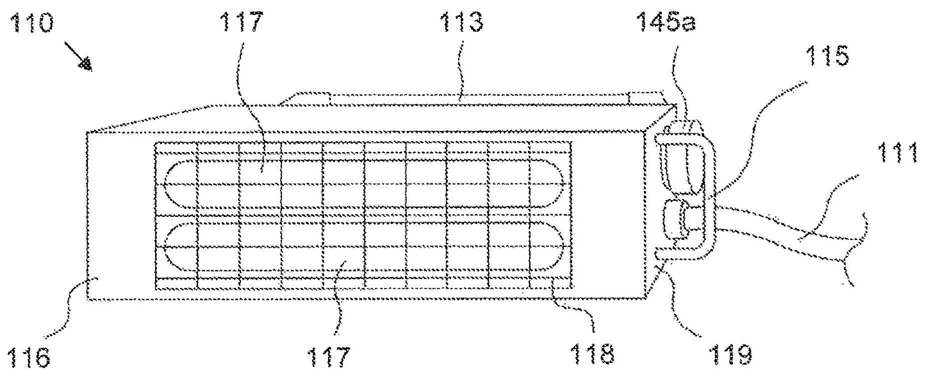
FIG. 2A illustrates an exemplary lamp assembly, according to an embodiment of the present disclosure.
Figure 2B:
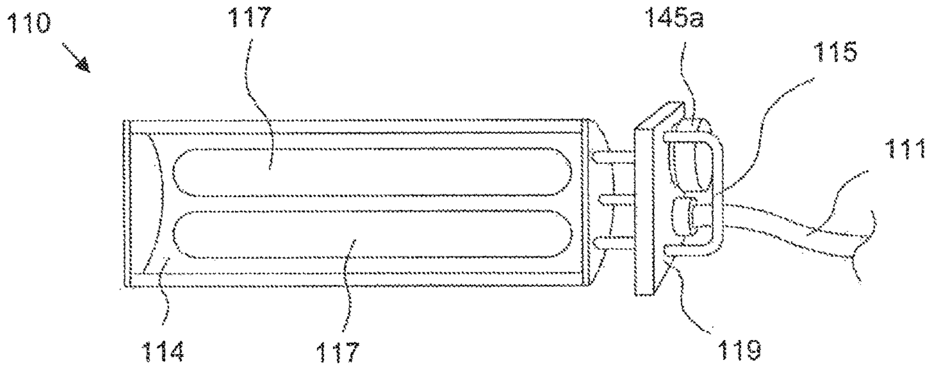
FIG. 2B illustrates an exemplary lamp assembly, according to an embodiment of the present disclosure.

Turning to FIGS. 2A and 2B, the lamp assembly 110 will be described in more detail. The lamp assembly 110 may include a housing 116 having a rectangular cross section. A handle 113 may be connected to the top of the housing 116. The handle 113 may be configured for grasping the lamp assembly 110 with one or two hands. The space between the housing 116 and the handle 113 may include three lamp fans 112. An opposite surface of the housing 116 may have an opening that permits the transmission of light from inside the housing 116 to the outside of the housing 116. The light may be emitted from two ultraviolet light lamps 117. In other embodiments, the lamp assembly 110 may include one or more than two light lamps 117. The opening may include a protective screen 118 to prevent accidental contact with the light lamps 117. The screen 118 may be comprised of metal or other materials resistant to heat.

The light lamps 117 may be situated in front of a reflector 114. The reflector 114 may be configured to reflect light emitted from a non-frontal portion of the light lamps 117 out of the opening. In particular, the reflector 114 may be curved, and may have a parabolic profile. The reflector 114 may have a plurality of holes (not shown) arranged along the longitudinal length of the light lamps 117 to allow air to pass through. Further, the holes may be arranged in multiple rows.

A side plate 119 may be connected to the reflector 114, and may include a handle 115 configured for sliding the reflector 114 and light lamps 117 out of the housing 116. The side plate 119 may also include a hole allowing the lamp cable 111 to pass through the side plate 119. The lamp cable 111 may be electrically connected to the light lamps 117 in series or in parallel through connectors, fuses, and wires (not shown). The side plate may also include a shut off button 145*a* configured for cutting off power to the light lamps 117. The light lamps 117 may be configured to be removed and replaced while outside of the housing 116. In some embodiments, the side plate 119 may include a push button safety switch on its inner surface that is configured to be depressed while the side plate 119 is in contact with the housing 116. In other embodiments, the housing 116 may include a push button safety switch on its inner surface opposite from the side plate 119 that is configured to be depressed while the side plate 119 is in contact with the housing. The push button safety switch may be configured to prevent the light lamps 117 from receiving power while the housing 116 is not closed with the side plate 119.

The lamp cable 111 may be in electrical communication with a power supply 150 within the electrical compartment 129. The power supply 150 may provide A/C power to the lamp assembly 110 through the lamp cable 111 at approximately 110 volts. In other embodiments, the power supply 150 may provide A/C power at approximately 220 volts. Still in other embodiments, the power supply 150 may provide D/C power to the lamp assembly 110. The power supply 150 may include a transformer 151 configured to receive and transform an input voltage of approximately 220 volts and provide the lamp assembly 110 approximately 110 volts. In other embodiments, the transformer 151 may receive and transform an input voltage of approximately 110 volts and provide the lamp assembly 110 approximately 220 volts. The transformer 151 may be configured to receive either approximately 110 volts or 220 volts and provide the lamp assembly 110 power at approximately the same input voltage. Each of the light lamps 117 may be high power lamps rated at 2400 watts or higher. In other embodiments, each of the light lamps 117 may be rated at 1200 watts or higher. In other embodiments, each of the lamps 117 may be 400 watts or higher. The light lamps 117 may be mercury-type lamps or gallium-doped lamps, and may have an arc length of six inches. In other embodiments, a plurality of LEDs may be used in the place of the light lamps 117.

Figure 3:
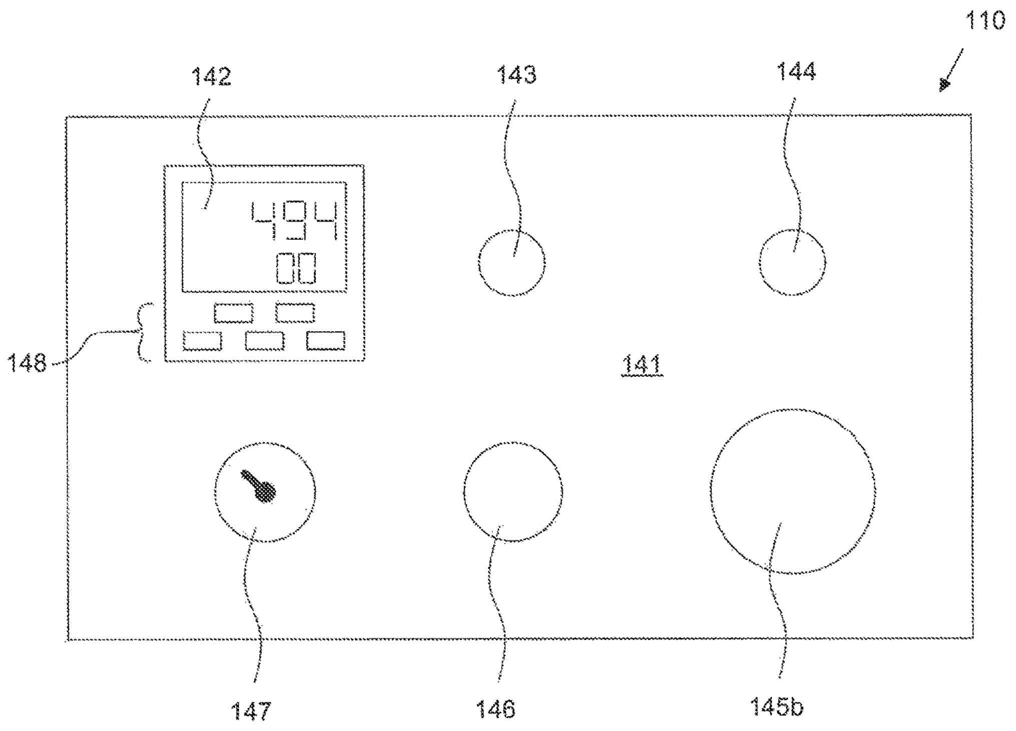
FIG. 3 illustrates an exemplary control plate, according to an embodiment of the present disclosure.

FIG. 3 depicts a top-view of the control panel 140. The control panel 140 may include inputs and indicators arranged on a control surface 141. The inputs may include a lamp stop button 145*b* for stopping the lamp, which may be similar to shut off button 145*a*. In addition, the inputs may include a lamp start button 146 configured to provide power to the lamp assembly 110 once it has been pressed. The indicators may include a system power light 144, which may be configured to illuminate when the power supply 150 is providing power to the control panel 140. The indicators may also include a lamp status light 143, which may be configured to illuminate in a first color while the light lamp 117 is emitting light in a low power mode or illuminate when the light lamp 117 is emitting light in a normal mode. The indicators may also include a display 142 configured for displaying a usage parameter, such as the duration of time that the light lamp 117 has been on. Further, the display 142 may include pluralities of indicators 148 for indicating that the light lamps 117 have been on for a period of time greater than a predetermined period of time. The pluralities of indicators 148 may serve as a warning that the light lamp 117 should be replaced. The plurality of indicators 148 may also indicate that the light lamp 117 is degrading. In addition, the inputs may include a keyed switch 147 that may be turned when a proper key (not shown) has been inserted, and it may be configured to reset the display 142 and the plurality of indicators 148 once it has been turned. The key may be the same key that is configured to open lock 130, or it may be a different key. In other embodiments, the control panel 140 may include a key-less rotating switch instead of the keyed switch 147. In addition, the control surface may include indicia for labeling each of the inputs and indicators.

The control panel 140 may also include at least one circuit 160. In other embodiments, the at least one circuit 160 may reside in the electrical compartment 129 or in both the control panel 140 and the electrical compartment 129. The circuit 160 may include a memory 161 for storing data, such as predetermined levels of time and lamp usage data. The circuit 160 may also include a usage measuring circuit 162 for measuring the amount of time that the light lamps 117 have been on and/or the total energy consumed by the light lamps 117 while emitting light. The usage measuring circuit 162 may also measure a value that is representative of the quality of the light lamps 117. For example, the usage measuring circuit 162 may measure current usage, heat transfer, or a portion of the light, and correlate these values with a degradation in the quality of the light lamps 117.

The circuit 160 may also include a transmitter 163. The transmitter 163 may be configured to transmit data to a computer 400 through a receiver 410 via a wired connection or a wireless connection. The wired connection may include, for example, one or more of a serial bus, universal serial bus, telephone, Ethernet, parallel, and FireWire. The wireless connection may include, for example, infrared and radio, such as Wi-Fi and Bluetooth. The computer 400 may be any type of processor and may be, for example, a stand-alone computer or laptop, a network, or a server. The data transmitted from the transmitter 163 to the computer 400, may include information, such as information measured by the usage measuring circuit 162 and/or light lamp 117 replacement information.

Figure 4:
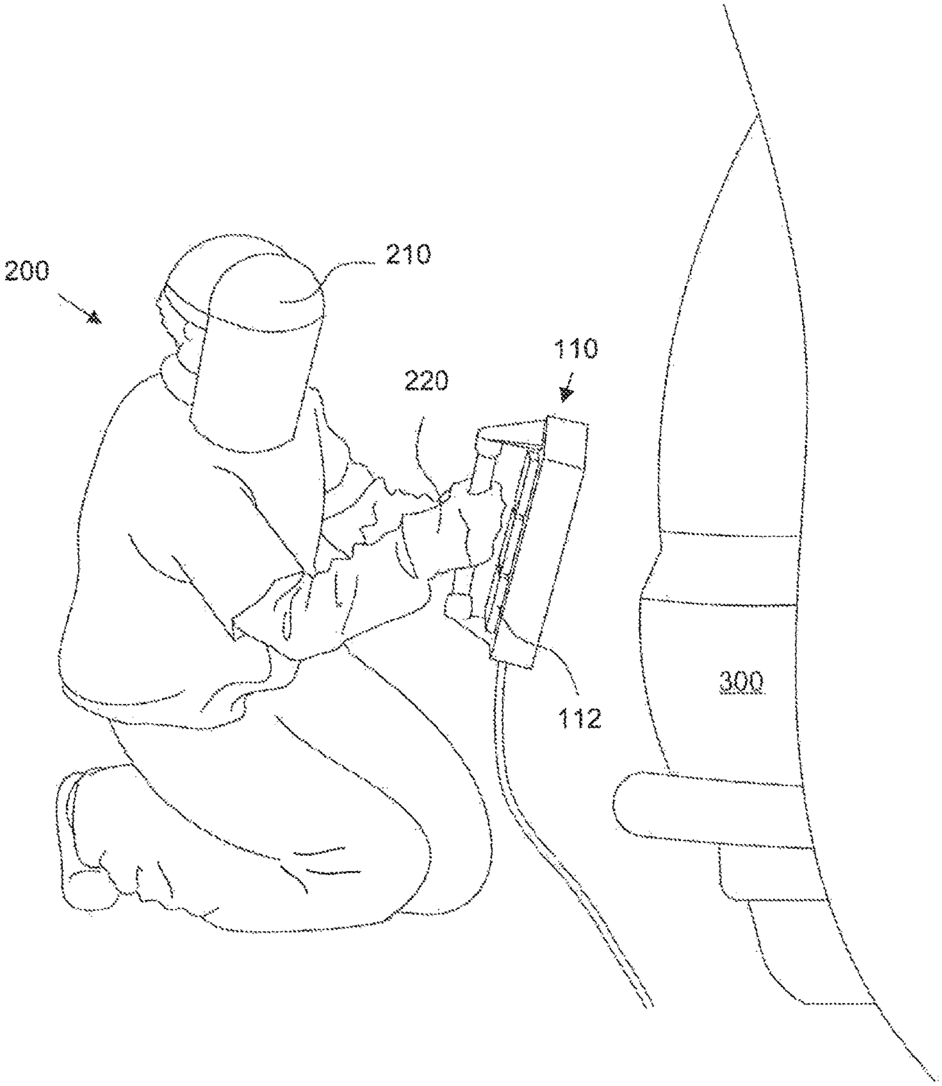
FIG. 4 illustrates an exemplary curing device, according to an embodiment of the present disclosure.
Figure 5:
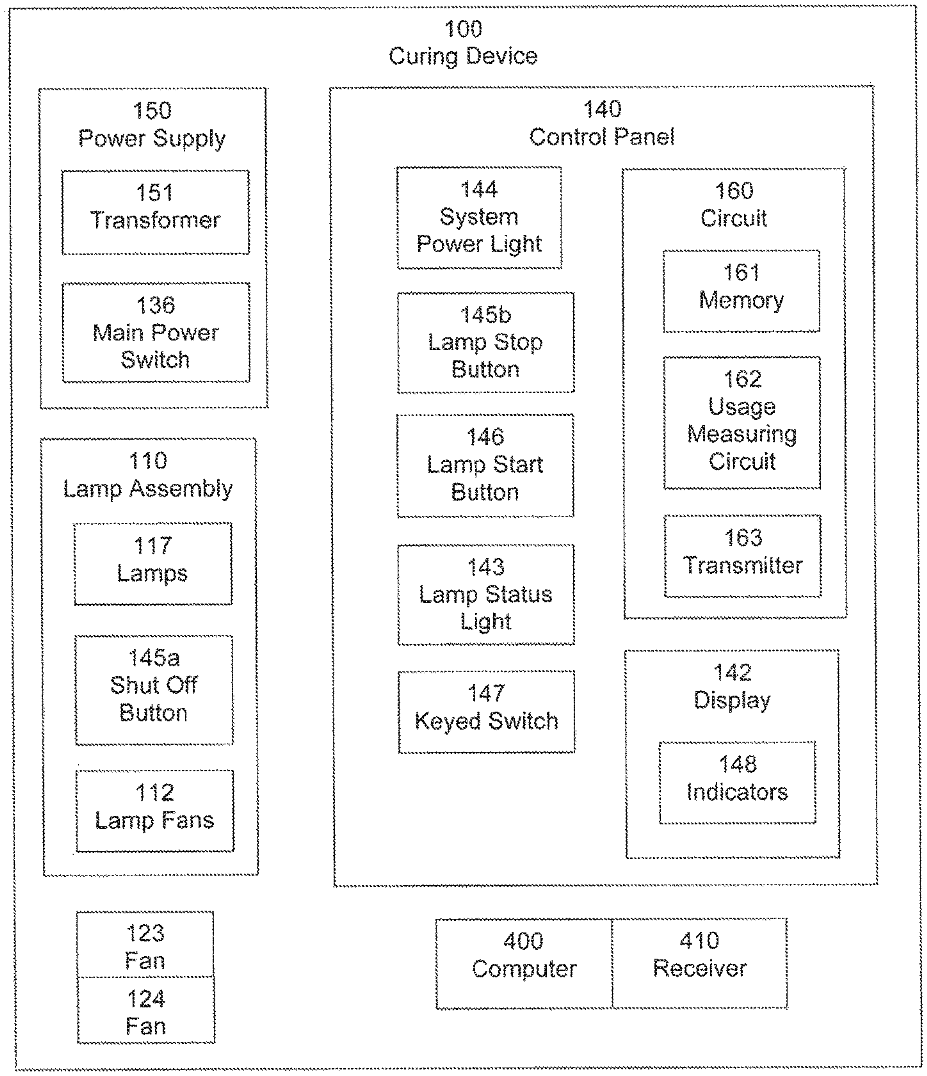
FIG. 5 is a diagram of an exemplary curing device, according to an embodiment of the present disclosure.

FIG. 4 depicts an operator 200 using the curing device 100 to cure a coating on a target automobile surface 300. The target automobile surface 300 may be the entire automobile surface or only a portion of the automobile surface that the operator intends to cure. The operator 200 may wear a safety mask 210 configured for blocking ultraviolet light. In addition, the operator 200 may wear protective gloves 220 and clothing configured to block ultraviolet light and cover all exposed surfaces of the operator's body. The curing device 100 may be used in a curing area defined by walls or curtains that are configured to block ultraviolet light.

During a curing operation, the operator 200 may hold the lamp assembly 110 within two feet from the target surface 300. Preferably, the operator 200 may hold the lamp assembly 110 within 12 inches of the target surface 300. Preferably, the operator 200 may hold the lamp assembly 110 between three and six inches away from the target surface 300. More preferably, the operator 200 may hold the lamp assembly 110 closer than three inches away from the target surface 300 in order to decrease the amount of time necessary to cure the coating on the target automobile surface 300. The operator 200 must take care not to keep the lamp assembly 110 too close to the target surface 300, because extended ultraviolet light exposure from a minimal distance may result in damage to the coating on the target surface 300. A minimal distance from which extended exposure to the ultraviolet light emitted by lamp assembly 110 should be avoided is less than one inch. The operator 200 may waive the lamp assembly 110 in front of the target surface 300, such that the light lamps 117 emit light towards the target surface 300 in a pattern that exposes the entire target surface 300 to the emitted light. Each pass of the lamp assembly 110 may overlay a previous pass by 50-75% of the exposure area. The operator 200 may move the lamp assembly 110 through this pattern at a speed exposing each portion of the target surface 300 to achieve a coating manufacture's recommended energy density, such as 100 $mJ/cm^2$. This speed of movement of the lamp assembly 110 may be between 1-50 cm/sec. Further, the operator may make 1-5 passes of the lamp assembly 110 over the entire target surface 300. Parameters that may affect curing may include the type of coating to be cured, the thickness of the coating, the ambient temperature in the curing zone, the humidity in the curing zone, the geometric size of the light lamps 117, the power output of the light lamps 117, the distance from the target surface 300, and the speed of passing the lamp assembly 110 over the target surface 300. After curing an automobile target surface 300, an operator 200 may immediately begin curing a different target surface of the same automobile. In addition, after curing an automobile target surface 300, an operator 200 may later cure a different target surface on a different automobile.

Figure 6:
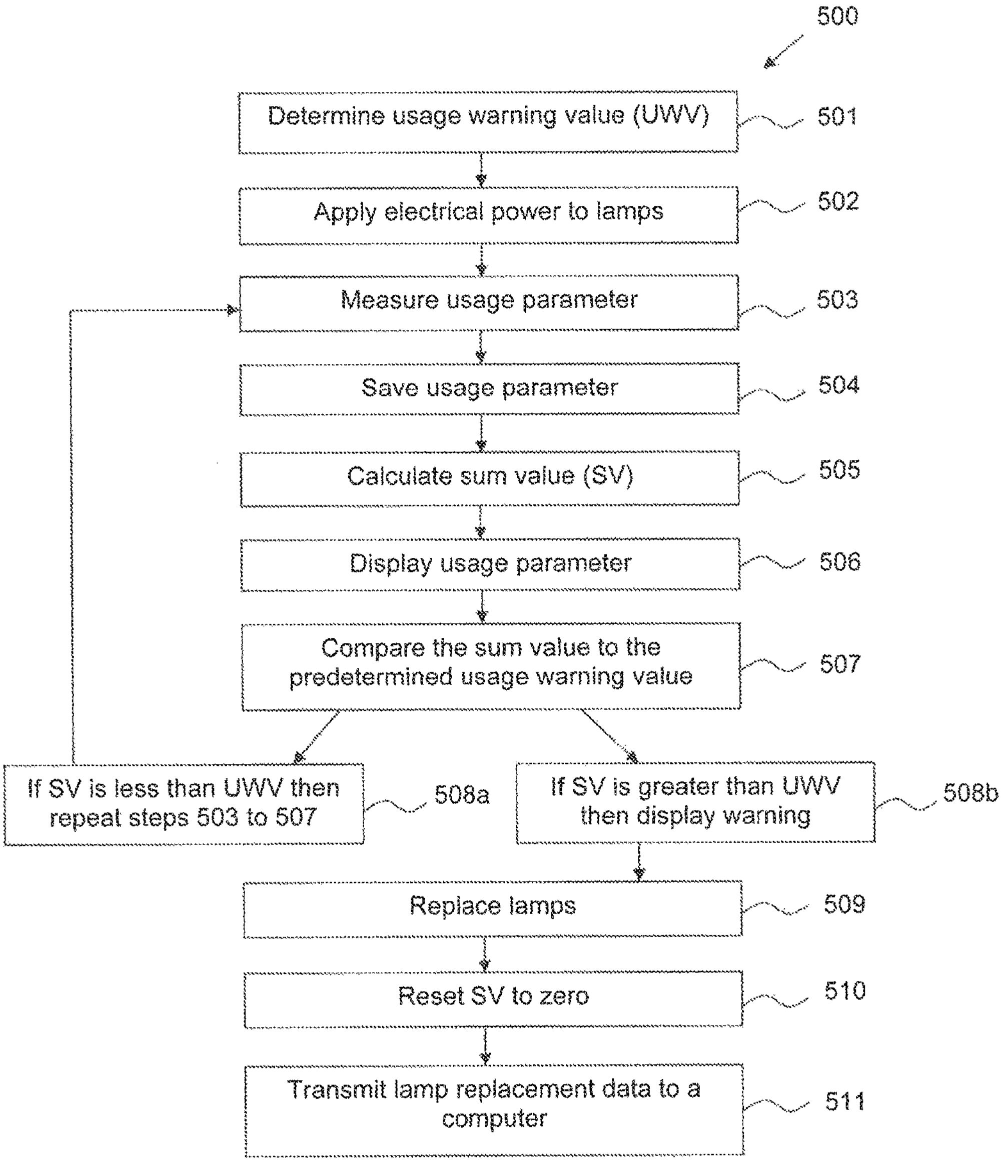
FIG. 6 depicts a method for changing an ultraviolet light source, according to an embodiment of the present disclosure.

FIG. 6 depicts a method 500 for changing an ultraviolet light source, such as the light lamps 117. The method 500 may include step 501, determining a usage warning value (UWV). The usage warning value UWV may be duration of time or an energy output. The usage warning value UWV may be one or more values. The usage warning value UWV may be indicated by a manufacturer of the bulbs of the light lamps 117 or they may be determined empirically. The usage parameter may include an energy consumption value in addition to, or instead of a period of time. The usage parameter may also include a value representative of the quality of the light lamps 117. The energy consumption value may be derived from electrical parameters, such as voltage*current*time, it may be based on a power rating of the light lamps 117, it may be derived indirectly from mechanical parameters such as heat transfer, or it may be derived from continuously monitoring a portion of the light output by using a photo sensitive circuit (not shown).

The method 500 may include a step 502, applying electrical power to the light lamps 117. This step may be performed by turning on the main power switch 136 and the lamp start button 146. Next, a step 503, measuring a usage parameter, may be performed. The usage measuring circuit 162 may monitor when the lamp start button 146 is pressed or when current is consumed by the light lamps 117, and then begin to measure an elapsed time. The usage measuring circuit 162 may also measure the voltage potential across the light lamps 117, or this value may be a fixed value based on the output from the transformer 151. The usage measuring circuit 162 may also measure the current consumed by the light lamps 117, it may use a predetermined value, or it may use the power rating of the light lamps 117. Next, a step 504, saving the usage parameter, may be performed. During this step, the usage measuring circuit 162 may save one or more of the start time, voltage, current, and power into the memory 161. As the light lamps 117 continue to emit light, the usage measuring circuit 162 may continue to measure the usage parameter. In step 505, calculating sum value (SV), the usage measuring circuit 162 may calculate the sum of the usage parameter obtained from the memory 161. This value may represent the total usage parameter associated with the light lamps 117. During a step 506, displaying the usage parameter, the current usage parameter stored since the time that the lamp start button 146 had been pressed or when current had been consumed by the light lamps 117, for example, may be displayed by display 142. In addition, or alternatively, the total usage parameter stored since the time that the light lamps 117 were installed in the lamp assembly 110 may be displayed by display 142. During a step 507, comparing the sum value SV to the predetermined usage warning value UWV, the usage measuring circuit 162 may compare SV to UWV. As shown in 508*a*, if SV is less than UWV, then steps 503 to 507 may be repeated. As shown in 508*b*, if SV is greater than UWV, then a warning may be displayed by indicator 148. The warning may be any one of a numeric code, light, or instruction indicating that the light lamps 117 should be replaced. If the usage warning value UWV includes multiple values, then method 500 may be repeated until each corresponding value has been reached. For each value that exceeds a usage warning value UWV, an associated indicator representing that respective value may be displayed by the indicator 148. During a step 509, replacing lamps, the light lamps 117 may be replaced. As indicated by step 510, resetting SV to zero, after the light lamps 117 have been replaced, the sum value in the memory 161 may be reset to zero. This may be done by turning the keyed switch 147 with a proper key.

During a step 511, transmitting light replacement data to a computer, information that indicates that a light lamp 117 had been replaced may be sent to a computer 400 by a transmitter 163 to update light lamp 117 inventory. Further, this information may be used to automatically or manually place orders by the computer 400 to obtain additional light lamps 117. Furthermore, usage parameter data may be sent by the transmitter 163 to the computer 400. The computer 400 may be able to track various statistical parameters, such as average cure times per equipment or per employee to identify faulty equipment and training opportunities. In addition, the computer 400 may be able to forecast approximate replacement schedules to ensure adequate supply of lamp lights 117. Also, the computer 400 may be able to obtain data from additional light curing devices 100 at the same location or at other locations to compile statistical parameters as discussed above, or maintain proper inventory at any of the multiple locations.

Figure 7:
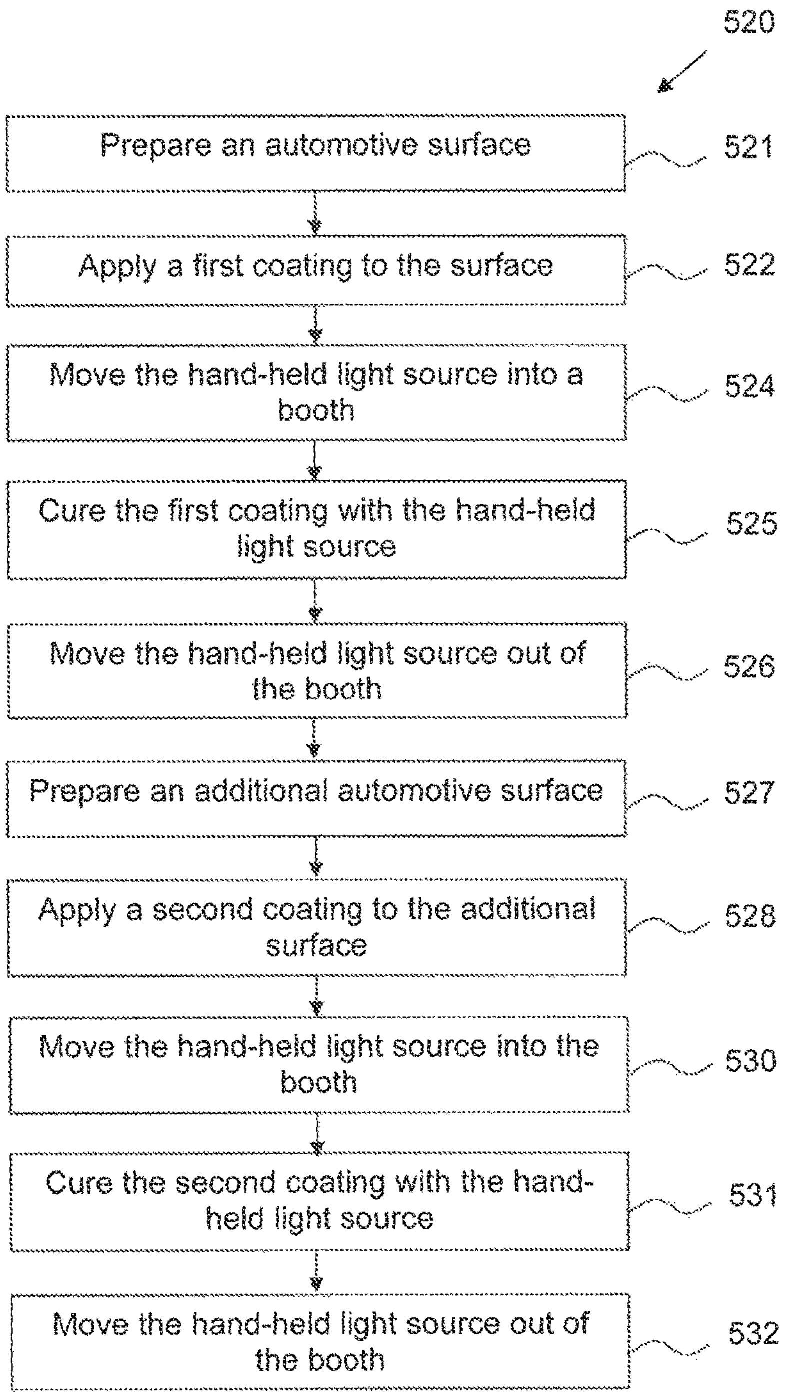
FIG. 7 depicts a method for curing a coating, according to an embodiment of the present disclosure.
Figure 8:
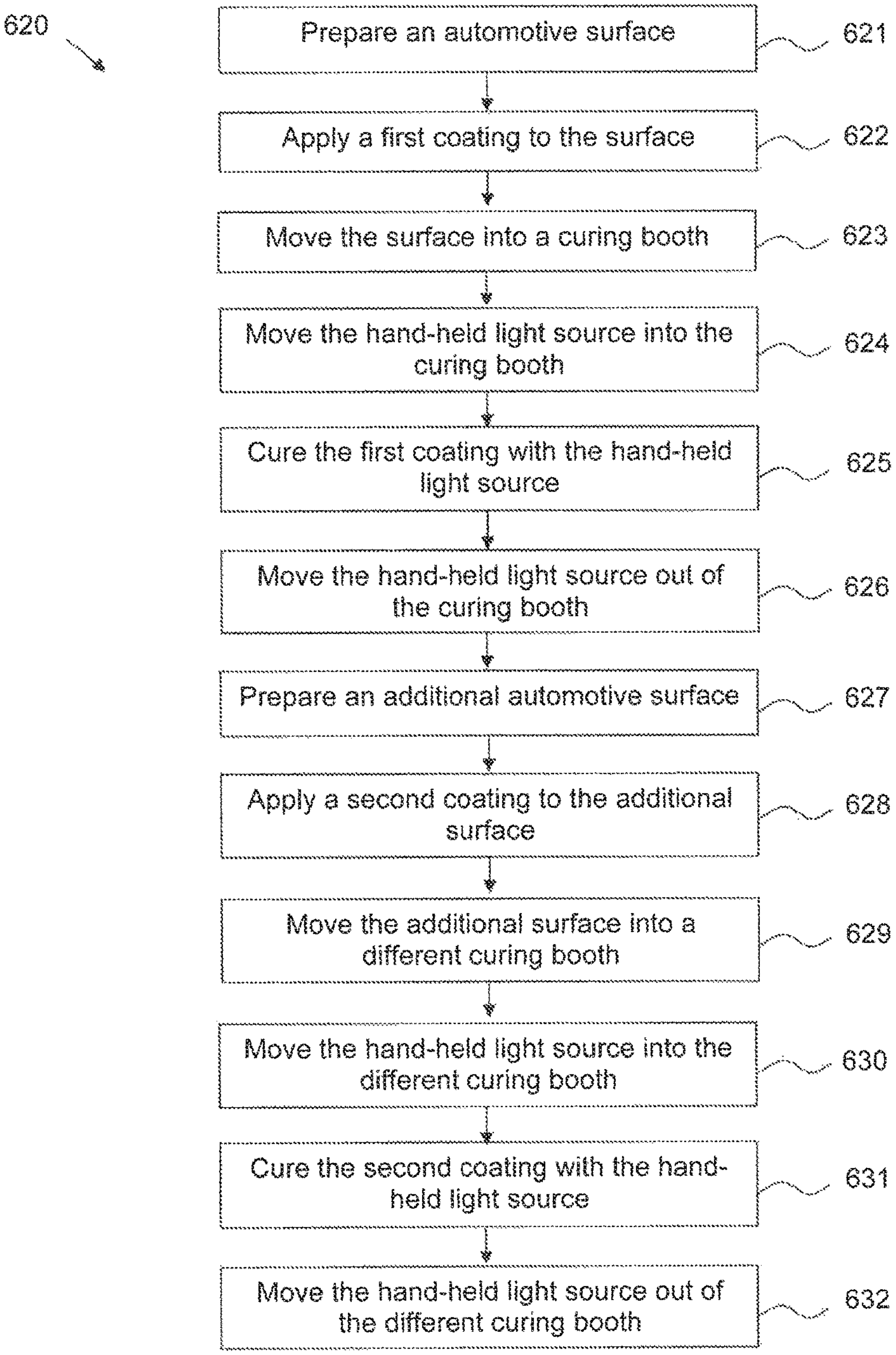
FIG. 8 depicts a method for curing a coating, according to an embodiment of the present disclosure.
Figure 9:
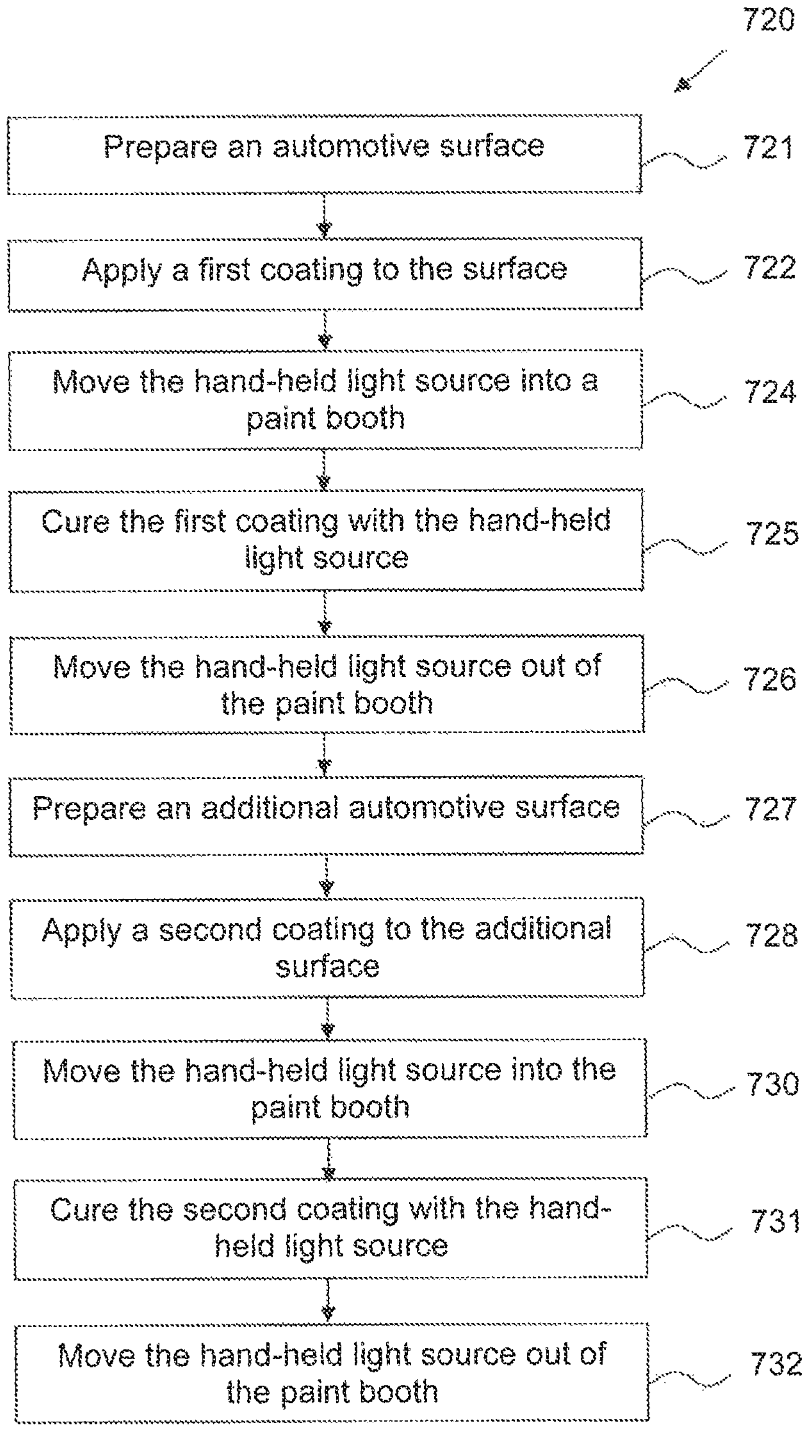
FIG. 9 depicts a method for curing a coating, according to an embodiment of the present disclosure.

FIGS. 7-9 depict methods for curing automotive coatings. As shown in FIG. 7, a method 520 may include a step 521, preparing an automotive surface. Preparing an automotive surface may include one or more of repairing, sanding, stripping, and any other preparation process to be performed on a surface before applying a coating. The surface may be a target surface 300. As discussed above with regard to FIG. 4, a target surface 300 may include an entire automotive surface or a portion of it. After the target surface 300 has been prepared, a step 522, applying a first coating to the surface may be performed. Applying a coating to the surface may include applying one or more layers of a primer, a color coat, and a clear coat. After a first coating has been applied to the target surface 300, a step 524, moving a hand-held light source into a booth may be performed. The hand-held light source may be the lamp assembly 110. This may include moving the lamp assembly 110 along with the base unit 120 into the booth or the base unit 120 may be left outside the booth. Moving only the lamp assembly 110 into the booth may reduce time, allow for more mobility inside the booth, and reduce potential electrical hazards. After the lamp assembly 110 has been moved into the booth, a step 525, curing the first coating with the hand-held light source may be performed. Curing the coating with the lamp assembly 110 may be carried out in a similar manner as described above with respect to FIG. 4. In addition, the method may include verifying that the light lamps 117 will not expire during curing the automotive coating before beginning to cure the automotive coating. This verification may be performed similarly as discussed above with regard to FIG. 6. Expiring may include burning out or substantially non-reversible consumption of the light lamps 117, rendering the light lamps 117 unusable. After the coating has been cured, a step 526, moving the hand-held light source out of the booth may be performed. During this step, the lamp assembly 110, the base unit 120, or both may be moved out of the booth. In some embodiments this step may be skipped, and the lamp assembly 110, the base unit 120, or both may remain in the booth for the subsequent curing operations.

The method 520 may also include a step 527, preparing an additional automotive surface. Preparing an additional automotive surface may be carried out in a similar manner as step 521 on the same automotive surface, a different automotive surface, a different portion of the same automotive surface, or a surface that is a part of a different automobile. Steps 528, applying a second coating to the additional surface; step 530, moving the hand-held light source into the booth; step 531, curing the second coating with the hand-held light source; and step 530, moving the hand-held light source out of the booth, may be carried out in a similar manner as corresponding steps 522 and 524-526. Furthermore, the coating applied to the additional surface in step 528 may be the same coating that is applied to the surface in step 522. For example, these coatings may have the same composition. In addition, these coatings may be different from one another in composition including, for example, color, manufacture, and luster.

FIG. 8 depicts a method 620 for curing automotive coatings. Method 620 is similar to method 520, but may further include a step 623, moving the surface into a curing booth and step 629, moving the addition surface into a different curing booth. After these steps are performed, a step 624, moving the hand-held light source into the curing booth and a step 630, moving the hand-held light source into the different curing booth, respectively, may be performed. Similar to method 520, these steps may include moving the lamp assembly 110 along with the base unit 120 into the respective curing booths or the base unit 120 may be left outside the respective curing booths.

FIG. 9 depicts a method 720 for curing automotive coatings. Method 720 is similar to method 520, but may include a step 724, moving the hand-held light source into a paint booth and a step 730, moving the hand-held light source into the paint booth. In other embodiments, the lamp assembly 110 may be moved into different curing booths. As is shown in FIG. 9, the target surface and additional target surface may be cured within the paint booth.

The many features and advantages of the present disclosure are apparent from the detailed specification, and thus, it is intended by the appended claims to cover all such features and advantages of the present disclosure that fall within the true spirit and scope of the present disclosure. Further, since numerous modifications and variations will readily occur to those skilled in the art, it is not desired to limit the present disclosure to the exact construction and operation illustrated and described, and accordingly, all suitable modifications and equivalents may be resorted to, falling within the scope of the present disclosure.

Moreover, those skilled in the art will appreciate that the conception upon which this disclosure is based may readily be used as a basis for designing other structures, methods, and systems for carrying out the several purposes of the present disclosure. Accordingly, the claims are not to be considered as limited by the foregoing description.

What is claimed is:

1. A method for using an ultraviolet light source comprising:

providing an ultraviolet light source;

applying electrical power to the ultraviolet light source, thereby causing the ultraviolet light source to emit ultraviolet light;

measuring a usage parameter while the ultraviolet light source emits ultraviolet light;

saving a usage value to memory that is representative of the usage parameter;

calculating a sum value based on at least the usage parameter;

comparing the sum value to a predetermined value; and replacing the ultraviolet light source when the sum value equals or exceeds the predetermined value;

wherein the usage parameter includes an amount of energy that the ultraviolet light source has consumed while emitting light.

2. A method for curing an automotive coating comprising:

applying a first automotive coating to at least one surface;

determining that a sum value based on at least a usage parameter does not exceed a predetermined value, wherein the usage parameter includes an amount of energy that the ultraviolet light source has consumed while emitting light;

moving, responsive to determining that the sum value does not exceed the predetermined value, a hand-held ultraviolet light source into a booth that has the at least one coated surface;

curing the first automotive coating with the ultraviolet light source;

moving the ultraviolet light source out of the booth that has the at least one coated surface;

applying a second automotive coating to at least one different surface;

moving the ultraviolet light source into a booth that has the at least one coated different surface;

curing the second automotive coating with the ultraviolet light source; and moving the ultraviolet light source out of the booth that has the at least one coated different surface.

3. The method of claim 2, wherein the composition of the first automotive coating is different from the composition of the second automotive coating.

4. The method of claim 2, wherein the composition of the first automotive coating is substantially the same as the composition of the second automotive coating.

5. The method of claim 2, wherein the booth that has the at least one coated surface is the same booth as the booth that has the at least one coated different surface.

6. The method of claim 2, wherein the booth that has the at least one coated surface is a different booth than the booth that has the at least one coated different surface.

7. The method of claim 6, wherein a boundary of at least one of the booths includes a curtain configured to block ultraviolet light.

8. The method of claim 2, wherein the automotive coatings applied to the at least one surface and the at least one different surface are applied in the same booth in which they are cured with the ultraviolet light source.

9. The method of claim 2, wherein the ultraviolet light source is attached to a base unit having a transformer for receiving AC power; and wherein moving an ultraviolet light source into a booth includes leaving the base unit outside of the booth.

10. The method of claim 2, wherein the ultraviolet light source is attached to a base unit having a transformer for receiving AC power; and wherein moving an ultraviolet light source into a booth includes moving the base unit into the booth.

11. The method of claim 2, wherein curing one of the automotive coatings with the ultraviolet light source includes holding the ultraviolet light source within 12 inches of the respective at least one surface.

12. The method of claim 11, wherein curing one of the automotive coatings with the ultraviolet light source includes holding the ultraviolet light source as close as possible to the respective at least one surface without contacting that surface.

13. The method of claim 2, further comprising, before curing one of the automotive coatings with the ultraviolet light source, verifying that the ultraviolet light source will not expire during curing of one of the automotive coatings.

14. The method of claim 13, further comprising replacing the ultraviolet light source before the ultraviolet light source expires.

15. The method of claim 2, wherein the ultraviolet light source is attached to a base unit having a transformer for receiving AC power; and wherein curing the automotive coating with the ultraviolet light source includes supplying electrical power to the ultraviolet light source at voltage less than the voltage that the transformer receives AC power.

16. The method of claim 2, further comprising applying an automotive coating to at least one surface; and curing the automotive coating with the ultraviolet light source.

17. The method of claim 2, wherein the at least one surface and the at least one different surface are a part of a first automobile.

18. The method of claim 2, wherein at least one surface is a part of a first automobile and the at least one different surface is a part of a second automobile.

19. A method for curing an automotive coating comprising:

providing a non-expired hand-held ultraviolet light source;

determining if the ultraviolet light source will expire during curing of an automotive coating based on a determination that a sum value based on at least a usage parameter of the ultraviolet light source does not exceed a predetermined value, wherein the usage parameter includes an amount of energy that the ultraviolet light source has consumed while emitting light;

applying an automotive coating to at least one surface;

curing the automotive coating with the ultraviolet light source; and replacing the ultraviolet light source.

20. The method of claim 19, wherein the ultraviolet light source is replaced before the ultraviolet light source expires.

* * * * *